Nov. 9, 1943.                M. R. HUTCHISON, JR                2,333,791
                              LIQUID FLOW METER
                             Filed April 11, 1942
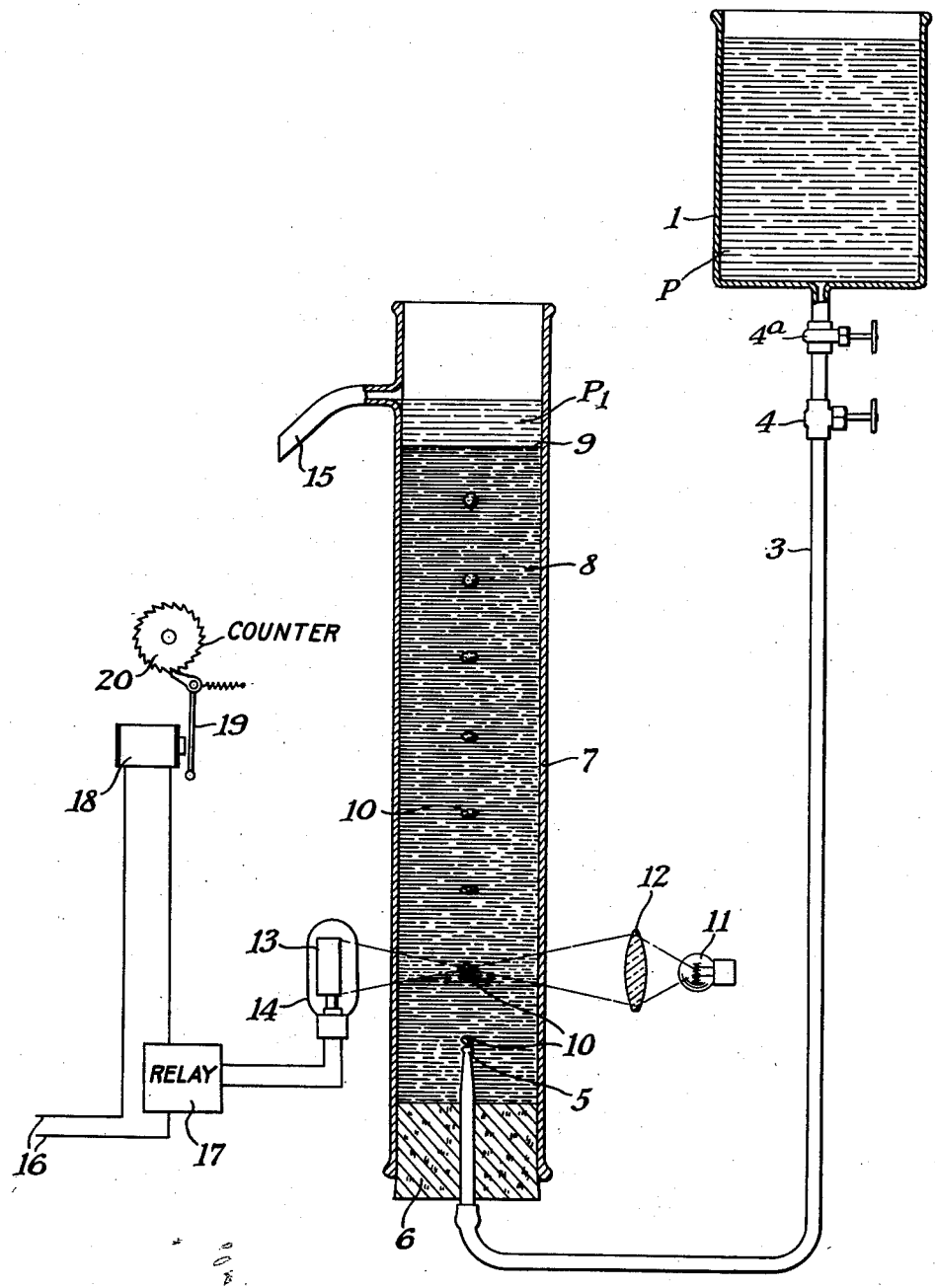
MILLER R. HUTCHISON, JR.
            INVENTOR
BY  Newton M. Perrin
    Clarence W. Carroll
                ATTY & AGT Patented Nov. 9, 1943

2,333,791

UNITED STATES PATENT OFFICE 2,333,791

LIQUID FLOWMETER

Miller R. Hutchison, Jr., Rochester, N. Y., assignor to Eastman Kodak Company, Rochester, N. Y., a corporation of New Jersey Application April 11, 1942, Serial No. 438,606

3 Claims. (Cl. 73—194)

This invention relates to liquid flow meters, and particularly to devices for correctly indicating a very slow flow or a very small quantity of liquid per unit of time. A major object of the invention is to provide such a device which comprises elements of utmost simplicity with elimination of mechanical parts that would be subject to wear, corrosion, and variable characteristics due to temperature changes and other external influences.

A practical example of a structure embodying this invention is shown in the accompanying drawing, which is somewhat diagrammatic and is not to be construed as representing the sole means of accomplishing the object above set forth. The drawing indicates the meter in sectional elevation.

The measurement of liquids flowing through pipes or orifices is a well known art insofar as the measurements concern considerable quantities of liquid to be measured, although the measuring devices are usually complicated and expensive. However, when very small quantities of liquid are involved, of the order of a few minims per minute, mechanical measuring instruments are inadequate and unreliable.

I have found that a liquid to be measured, when passed through a pipe terminating in an upwardly directed nozzle with a restricted orifice is allowed to flow slowly therethrough, it will issue from the nozzle in a regular series of globules if the orifice is immersed in a liquid of a higher specific gravity, and with which the liquid issuing from the nozzle is immiscible. The globules as they emerge from the nozzle rise one by one to the top of the heavier liquid. In the present invention means are provided whereby each globule as it rises will intercept a ray of light which is arranged to pass constantly through the heavier liquid to a light-sensitive cell. The latter, through a suitable relay, may employ standard electrical impulses to actuate a counter of any suitable type, thereby ultimately providing an indication of the flow.

A structure as above outlined, reduced to simple elements, may comprise a reservoir 1 holding the fluid P to be measured (hereinafter entitled the product), which may be low-gravity liquid such as gasoline. A pipe 3 provided with a suitable manually controlled valve 4 serves to conduct the product from the reservoir 1 to the restricted terminal orifice of nozzle 5, which may resemble an ordinary medicine dropper.

The nozzle 5 is supported in a cap or closure 6, at the bottom of a column 7, the latter being of transparent material such as glass or acrylic plastic. The column is filled with a liquid 8, having a higher specific gravity than the product P, for instance glycerine, to a level indicated at 9, which must be below the bottom of reservoir 1. The liquid 8 must be one in which the product P will not mix or be dissolved. It is also essential that reservoir 1 be located high enough to provide a sufficient head of the product in pipe 3 to overcome the tendency of the heavier liquid in the column to back up in the pipe.

When the valve 4 is opened the product P flows through pipe 3 by gravity. In practice the valve is barely "cracked" so that when a slight dribble of the product accumulates in the nozzle 5 a slug will form which eventually rises and breaks free, floating to the top in globular form as indicated at 10. As successive slugs or globules rise, actually at very regular intervals, they accumulate at P, eventually overflowing through a side outlet 15. A valve 4a is also provided so that the product may be shut off completely without disturbing the valve 4.

The manner of utilizing the column and the rising globules as a measuring device consists in employing suitable means for counting the globules as they rise from the nozzle 5. Obviously, if the globules are counted it is quite simple to catch the product in a receptacle at the pipe 15 and time the output from the beginning to the end of the flow. This can be measured and the rate of flow or the number of globules per unit of time ascertained, and thus a given quantity may be accurately determined.

A simple means for counting the rising globules is shown as comprising a light source 11, rays from which pass through a lens 12 to a focus at the center of the column 7, whence they disperse and emerge from the other side of the column and impinge on the plate 13 of a photo-cell 14.

As is well known, electric energy flowing through the plate will vary in accordance with the amount of light falling thereon. Therefore, each time a globule 10 of the product rises through the column liquid 8 it intercepts the light beam and affects the output of the cell plate 13. Current from a supply source 16 through a relay 17 is thus periodically directed through an electromagnet 18 which in turn moves an armature 19 to rotate step-by-step a ratchet 20 that may be connected to any suitable counting mechanism, not detailed in the drawing. Thus the ratchet or counter is moved one unit for each globule that passes through the light beam.

As before stated, when the volume of a globule is once established, as by measuring the total output from tube 15 after a given number of globules have passed the light beam, a count of any number thereafter may be made and their volume or liquid measure accurately determined.

I claim:

1. A liquid flow meter comprising a transparent column containing a liquid heavier than the product to be metered, a conduit for the product terminating in a restricted orifice within the column, an electronic indicating device including a light source the rays from which are focused within the column, said rays being adapted to affect the indicating device as portions of the product escape from the orifice and rise through the column.

2. A liquid flow meter comprising a column containing a liquid of higher specific gravity than the product to be metered, both the liquid and the column being light-permeable, means for conducting the product into the column and for permitting uniform portions of the product to escape at spaced intervals and rise upwardly through the liquid, a light source, an electronic indicating apparatus, and means for projecting light from said source through the column to the indicating apparatus, whereby the rising portions of the product intercepting the light rays affect the indicating apparatus to indicate the flow of the product.

3. A liquid flow meter comprising a column containing a liquid of higher specific gravity than the product to be metered, both the liquid and the column being light-permeable, means for conducting the product into the column, means for controlling the flow of the product whereby uniform globules thereof are permitted to rise through the liquid intermittently, means for projecting light rays through the column so that the rising globules intercept said rays, and indicating apparatus including means adapted to be affected by said rays after the latter have passed the rising globules.

MILLER R. HUTCHISON, Jr.